July 29, 1958 E. F. BAHAN 2,845,160
CLUTCH CONTROL FOR LOOM SHAFT DRIVE
Filed April 6, 1953 5 Sheets-Sheet 2
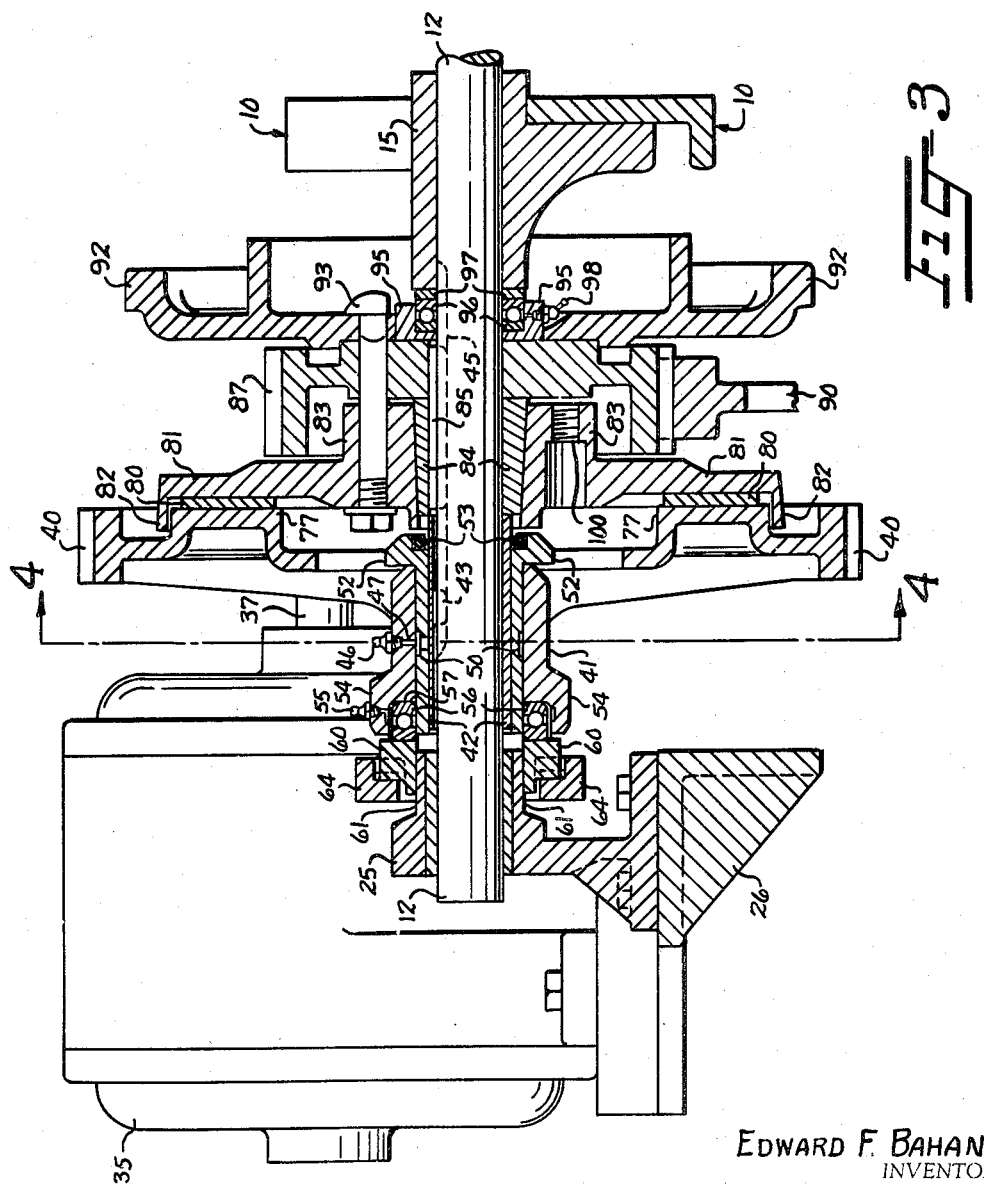
EDWARD F. BAHAN,
INVENTOR.
ATTORNEYS.

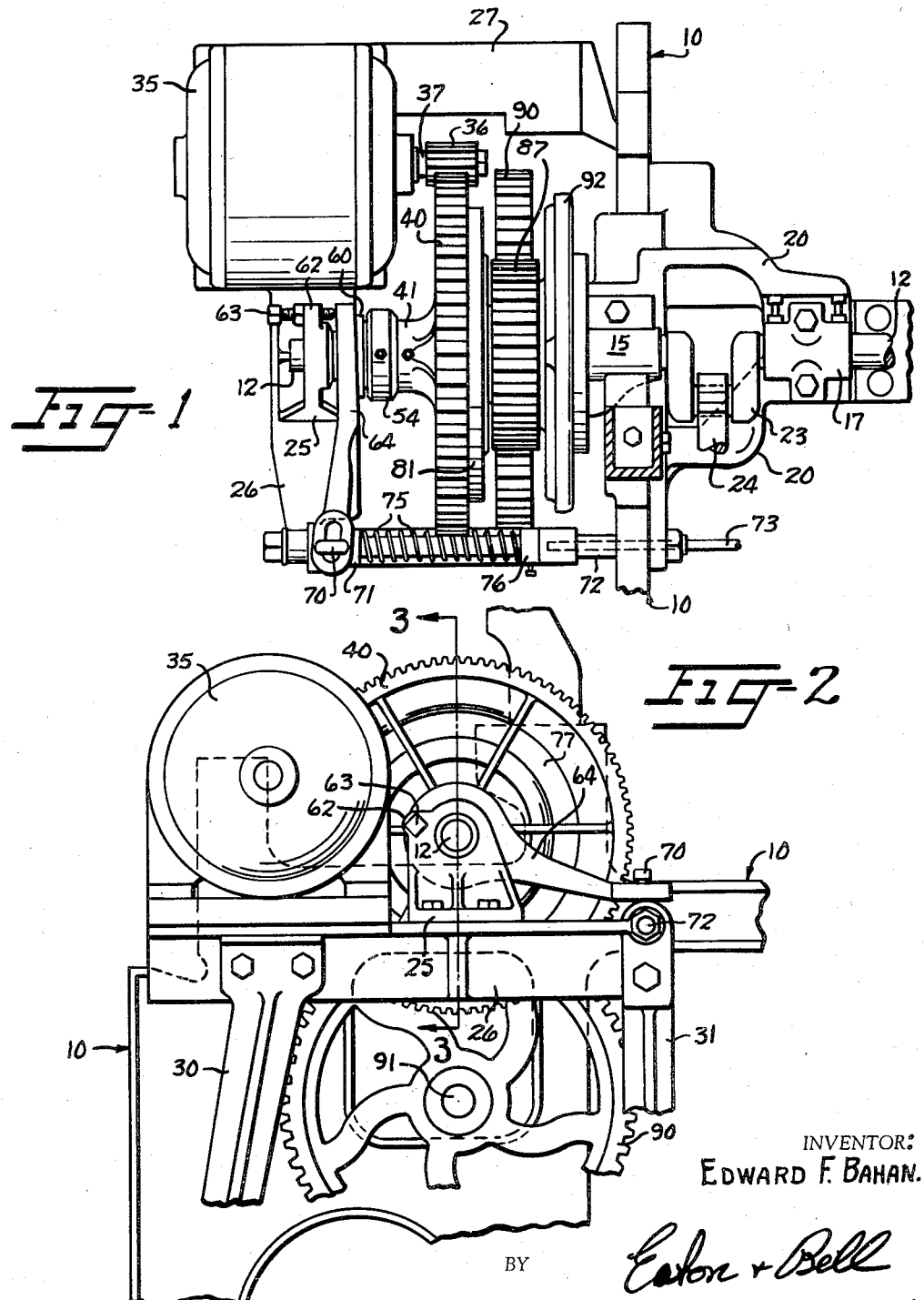

July 29, 1958        E. F. BAHAN        2,845,160
CLUTCH CONTROL FOR LOOM SHAFT DRIVE
Filed April 6, 1953        5 Sheets-Sheet 3
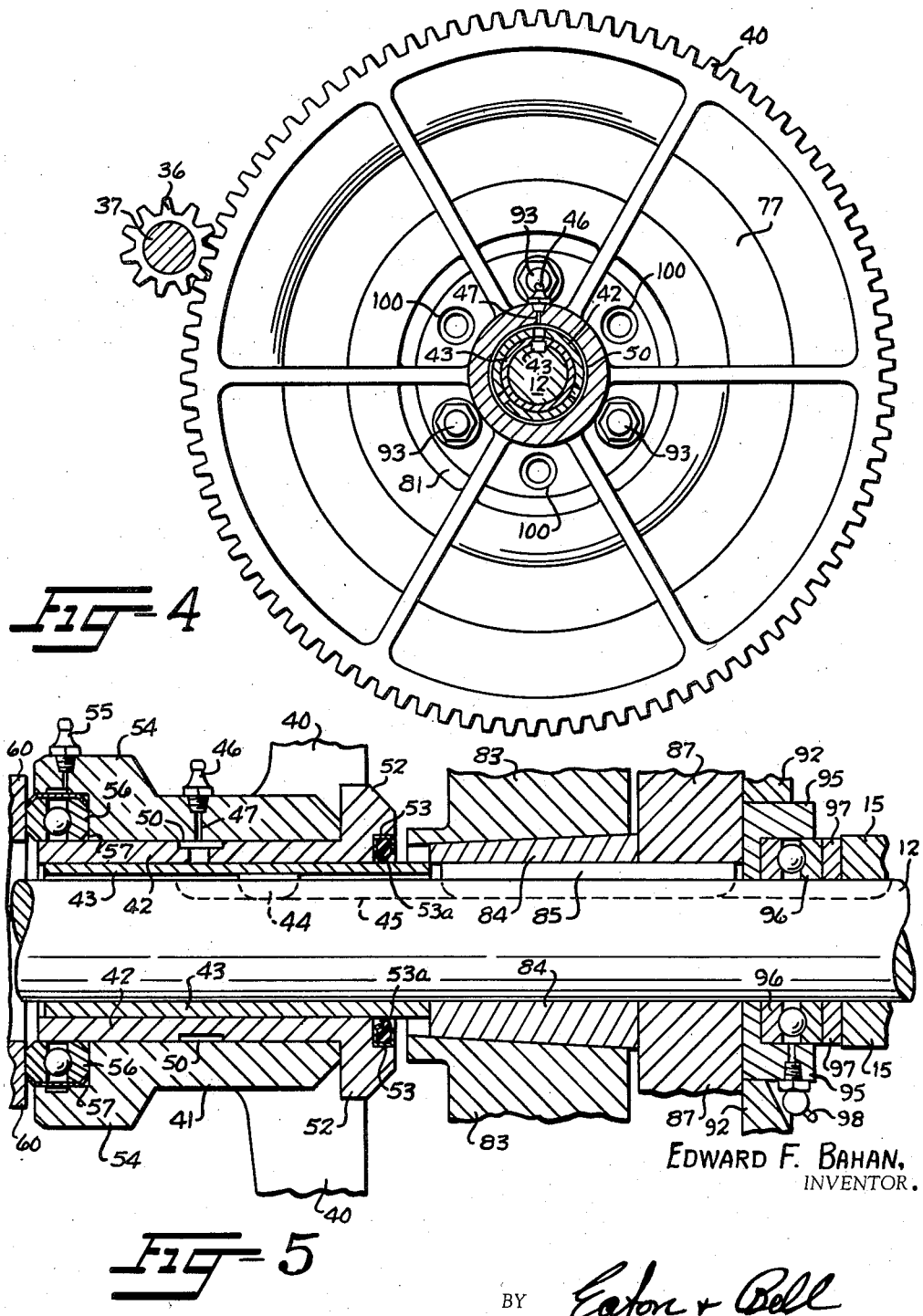
EDWARD F. BAHAN,
INVENTOR.
BY Eaton & Bell
ATTORNEYS.

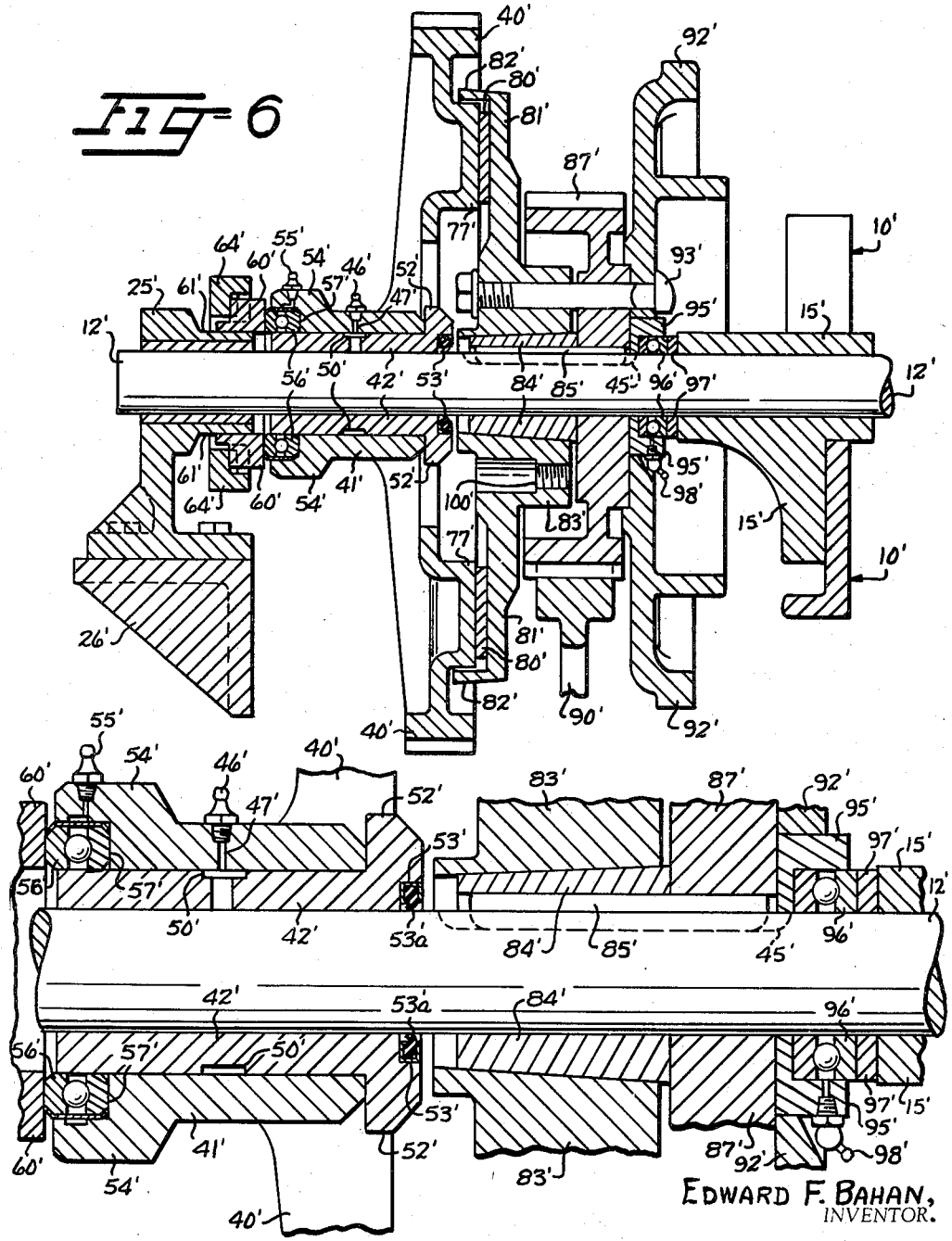

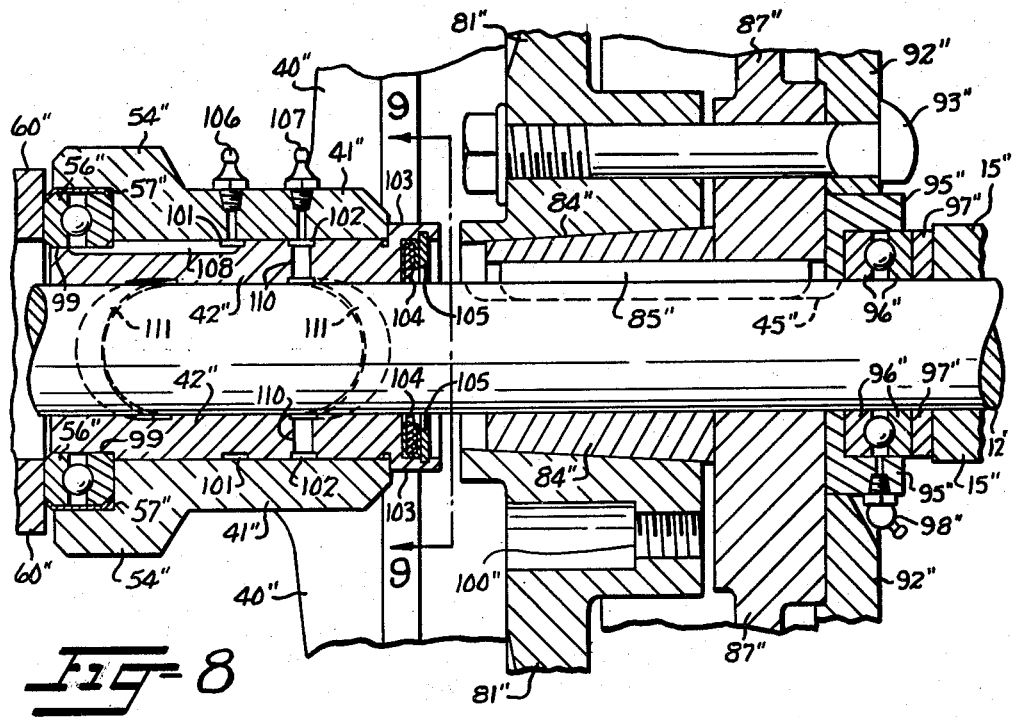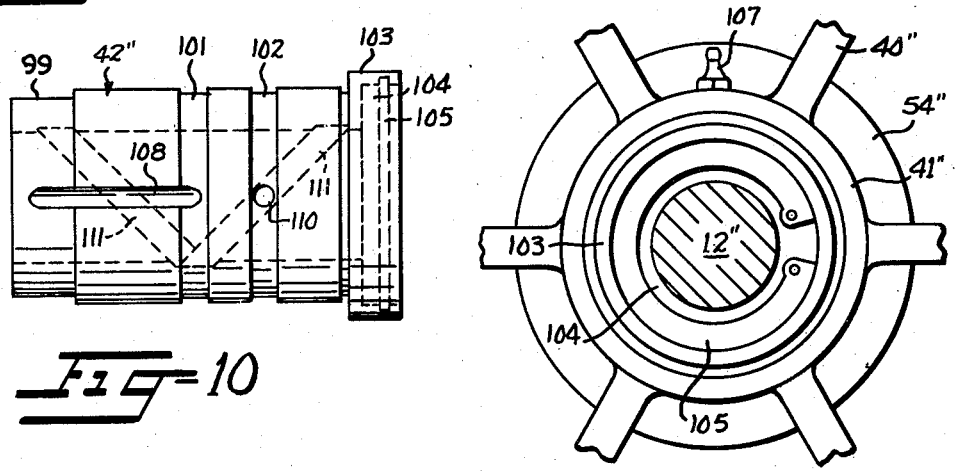

United States Patent Office 2,845,160
Patented July 29, 1958

2,845,160

CLUTCH CONTROL FOR LOOM SHAFT DRIVE

Edward F. Bahan, Greenville, S. C., assignor to Bahan Textile Machinery Company, Inc., Greenville, S. C., a corporation of South Carolina Application April 6, 1953, Serial No. 346,923

9 Claims. (Cl. 192—66)

This invention relates to loom drive shafts and more especially to lubricating means and mounting means for a friction disc type drive usually associated with textile machines such as looms.

Heretofore, friction disc drives have included a driven disc friction gear rotatably mounted on the loom drive shaft and having an annular clutch face thereon, said driven gear being axially movable along the loom drive shaft for driving engagement with a clutch plate fixedly mounted on said loom shaft. The main objection to this friction type drive for loom shafts has been that oil and lubricants applied between the drive shaft and drive gear impregnates the friction disc, thereby rendering the friction disc ineffective so that there is no positive grip between the friction disc and the driving gear and resulting in a slippage therebetween.

It is, therefore, the primary object of this invention to provide means for mounting the disc friction gear on the drive shaft with means for lubricating the driven gear as well as thrust bearings provided therefor and means to prohibit the lubricant from coming into contact with the clutch plate or the clutch face on the driven gear.

It is another object of this invention to provide thrust bearings which are floating relative to the loom frame, rather than having the thrust bearings mounted in stationary bearing stands, so that, as the loom shaft or the bearings in which the loom shaft are mounted become worn, the floating thrust bearings will follow the shaft rather than have the shaft cut into the thrust bearings.

It is still another object of this invention to provide a means for mounting a disc friction gear on a loom shaft of the type having a relatively long keyway therein, which includes a sleeve covering said keyway, and an insert rotatably mounted on said sleeve and fixed in said disc friction gear. Where the keyway is relatively short, the sleeve may be omitted and the insert mounted directly on the shaft.

Some of the objects of the invention having been stated, other objects will appear as the description proceeds, when taken in connection with the accompanying drawings, in which—

Figure 1 is a plan view of one end of a loom showing the improved loom shaft drive attached thereto;

Figure 2 is an end elevation of a part of the driving end of a loom and showing the improved drive associated therewith;

Figure 3 is an enlarged longitudinal vertical sectional view taken substantially along the line 3—3 in Figure 2;

Figure 4 is a transverse vertical sectional view taken substantially along the line 4—4 in Figure 3;

Figure 5 is an enlarged view of the central portion of Figure 3;

Figure 6 is a view similar to Figure 3 but showing a modified form of lubricant sealing means;

Figure 7 is an enlarged view of the central portion of Figure 6;

Figure 8 is a view similar to Figure 6 but showing another modified form of lubricant distribution and sealing means;

Figure 9 is a vertical sectional view taken along the line 9—9 in Figure 8;

Figure 10 is a plan view of the insert removed from the hub of the disc friction gear.

Referring to the drawings, the numeral 10 broadly designates one side frame of a loom, not shown, having a drive shaft or crank shaft 12 which extends transversely of the loom and which is supported at opposed ends at the loom side frames in suitable bearings 15, only one of which is shown in the drawings. The drive shaft 12 is also supported intermediate its ends by bearings 17 secured to a girt 20 secured to and extending from one side frame of the loom to the other. The loom drive shaft 12 is also provided with crank throws 23 adjacent each side frame and to each of which a conventional connecting rod 24 is pivotally secured. Each of the connecting rods 24 leads to the conventional lay, not shown, of the loom for transmitting oscillation thereto in a conventional and well known manner.

The outer end of the drive shaft 12 (Figures 1, 2 and 3) is rotatably mounted and supported in a friction clutch lever stand or bearing 25 fixedly secured to a transversely extending motor support bracket 26 which has an inwardly extending leg 27 suitably connected to the side frame 10 of the loom. The motor support bracket 26 is supported by a pair of legs 30 and 31 fixedly secured thereto and extending downwardly and inwardly and fixedly secured to the side frame 10 of the loom.

An electric motor 35 is adjustably mounted on the motor support bracket 26 and is provided with a small spur gear 36 fixed on the motor shaft 37 which engages and continuously drives a disc friction gear 40. The disc friction gear 40 has a hub portion 41 integral therewith in which a tubular insert 42 is positioned as by a pressed fit. The tubular insert 42 is rotatably mounted on a sleeve 43 which surrounds the shaft 12 and is fixed against rotational movement relative thereto as by a key 44 which fits in a keyway 45 in the shaft 12. The arrangement of the hub portion 41 and associated parts is a novel and important feature of the present invention.

The hub portion 41 is provided with a grease fitting 46 and a lubricant passageway 47 which is in vertical alinement with an annular groove 50 cut in the insert 42 in the disc friction gear 40. The tubular insert 42 has a plurality of drilled holes spaced therearound communicating with the groove 50 so that the lubricant injected into the fitting 46 may pass therethrough and lubricate the insert 42 as it rotates about the sleeve 43.

The insert 42 has an enlarged portion 52 adjacent its inner or right hand end, in Figures 3 and 5 provided with a counterbore in which a grease seal 53 is pressed. The seal 53 includes a resilient wiper element 53a which engages the sleeves 43 to provide a seal for oil and grease. The seal 53 will prevent lubricant from passing out from the right hand or inner end of the insert 42 and in the event that too much lubricant is forced into the fitting 46, it will not be forced by the seal 53 but will go in the opposite direction.

The outer or left hand end of the hub 41 of the disc friction gear 40 is provided with an enlarged portion 54 having a grease fitting 55 threadably mounted therein and a communicative passageway communicating with an outer thrust bearing 56 mounted in an enlarged bore 57 therein.

The thrust bearing 56 is at times engaged by a pressure applying sleeve 60 which is slidably mounted on a reduced portion 61 of the friction clutch lever stand 25. The friction clutch lever stand 25 is provided with an ear 62 having an adjustment screw 63 threadably mounted therein, the inner end of which enages a friction clutch lever 64 which encircles the shaft 12 as well as the pressure applying sleeve 60 and engages a pair of diametrically opposed ears, not shown, on the pressure applying sleeve 60. The friction clutch lever 64 extends downwardly in Figure 1 and is pivotally mounted on a stud 70 fixedly mounted on a conventional shipper sleeve 71 which is slidably mounted on a shipper sleeve stud 72. The shipper sleeve stud 72 is fixedly mounted at its outer end in the motor support bracket 26 and the inner end thereof is fixedly mounted in the side frame 10 of the loom.

A shipper rod 73 is conventionally connected to a shipper handle, not shown, which extends to and is suitably connected to the shipper sleeve 71. As the shipper rod 73 is caused to move from left to right in Figure 1, by moving the shipper handle to the start position, to thereby move the stud 70 and the friction clutch lever 64 to the right against the adjustment stud 63, this will tighten the pressure applying sleeve 60 against the thrust bearing 56 to thus move the disc friction gear 40 to the right along the sleeve 42.

As the shipper rod 73 is released or moved from right to left in Figure 1, by moving the shipper handle to the knock-off position, the shipper sleeve 71 is caused to move from right to left by a shipper sleeve spring 75 which encircles the shipper sleeve stud 72 and bears against the shipper sleeve 71 and an adjustment collar 76 fixedly mounted on the shipper sleeve stud 72. The shipper sleeve spring 75 normally urges the shipper sleeve 71 from right to left in Figure 1 to thus normally urge the lower end (Figure 1) of the friction clutch lever 64 from right to left in Figure 1.

The disc friction gear 40 is provided with an annular inwardly extending clutch face 77. The clutch face 77 is at times engaged by a clutch plate 80 fiixedly secured to a friction disc 81. The friction disc 81 is provided with an inwardly projecting flange 82 integral with the outer periphery thereof and extends over the outer edge of the clutch face 77. The flange 82 is provided to prevent dirt, lint and other foreign matter from passing into the space between the clutch plate 80 and the clutch face 77 which would decrease the efficiency of the cltuch plate 80.

The friction disc 81 has a hub portion 83 integral therewith which is mounted on a tapered split sleeve 84 surrounding the shaft 12 and which is keyed to the shaft 12 as by a key 85 engaging the keyway 45 therein. A crank shaft gear 87 is also keyed to the shaft 12 by the key 85 and engages a cam shaft gear 90 which is fixed on a main cam shaft 91 (Figure 2) of the loom 10.

A hand wheel 92 is fixedly secured to the right hand or inner end of the crank shaft gear 87 as by a plurality of carriage bolts 93, there being three of these bolts in this instance, shown in Figure 4, which extend through the hand wheel 92, the crank shaft gear 87 and the friction disc 81 and prevents relative movement between the same. The hand wheel 92 is provided with a centrally disposed bore into which a pressure collar 95 fits. The collar 95 surrounds and partially extends over an inner thrust bearing 96 bearing against a washer 97 surrounding the shaft 12, the inner end of which bears against the drive shaft bearing 15. The hand wheel 92 is cut away to provide space for a grease fitting 98, which is threadably mounted in the collar 95 and has a communicative passageway leading to the thrust bearing 96.

It is thus seen that as the disc friction gear 40 is moved to the right in Figure 3 as heretofore described, the clutch face 77 will engage the clutch plate 80 to thereby impart rotation to the drive shaft 12 from the motor 35 through the gear 36, the disc friction gear 40, and the friction disc 81.

As the clutch plate 80 wears down through continued use, it is necessary to adjust the pressure applied thereto by the clutch face 77 of the disc friction gear 40 by adjustment of the adjustment screw 63 in the friction clutch lever stand 25 so that the same amount of relative movement by the shipper rod 73 will move the disc friction gear 40 further to the right in Figure 3 as the shipper rod 73 is moved from right to left in Figure 1.

When the loom is running, the disc friction gear 40 rotates with the shaft 12, but upon stopping the loom without stopping the electric motor 35, the disc friction gear 40 rotates freely relative to the shaft 12. It is, therefore, necessary that the disc friction gear 40 be lubricated to prevent excessive wear as it is rotated around the shaft 12. This lubrication is usually accomplished by a high pressure grease gun connected to the grease fitting 46 in the hub 41 of the disc friction gear 40 by a loom operator to force the grease or lubricant into the passageway 47.

Heretofore, this grease or lubricant has been forced in both directions from the passageway 47 and caused to move out both ends of the hub 41. In such a case, centrifugal force would move the grease outwardly along the disc friction gear 40 and eventually onto the clutch face 77 of the disc fritcion gear 40 and between the clutch plate 80 and the clutch face 77, thereby greatly decreasing the efficiency of the clutch. Frequently, in compensating for slippage between the clutch face 77 and the plate 80, the screw 63 would be adjusted to exert too much pressure which would result in damage to the bearings and associated parts.

It is thus seen that there is provided an improved loom shaft drive including means for sealing the inner end of the disc friction gear 40 while leaving the outer end of the hub portion 41 thereof unsealed to prevent grease from passing to the clutch plate 80 and permitting any excessive amount of grease inserted through the grease fitting 46 to move outwardly away from the clutch face 77 where it will do no harm to the clutch plate 80.

In the event that the clutch plate 80 becomes so worn that it has to be replaced, there are provided a plurality of threaded bores 100 in the hub portion 83 of the friction disc 81 which may be used to help remove the friction disc 81 from the tapered split sleeve 84 and the shaft 12. After removing the friction clutch lever stand 25, the disc friction gear 40 and the carriage bolts 93, suitable bolts may be threaded into the threaded bores 100 until they bear against the crank shaft gear 87 and with continued turning thereof the friction disc 81 will be removed away from the crank shaft 87, after which, the bolts in the threaded bores 100 may be removed and the clutch plate 80 replaced. The friction disc 81 may then be put back on the shaft 12 and the split tapered sleeve 84 and tightened thereon by the carriage bolts 93 to thus make the friction disc 81, crank shaft gear 87 and hand wheel 92 an integral part keyed to the shaft 12.

The form of invention shown in Figures 1 through 5, inclusive, is intended for use on existing looms where the keyway for the keys 85 and 43 is relatively long and the sleeve 42 is provided to close the keyway in the shaft 12 so that the grease or lubricant introduced into the grease fitting 46 will not contact the keyway and be forced therein so that it may escape onto the clutch plate 80.

The modified form of invention shown in Figures 6 and 7 is adapted to be used on new loom installations where the shaft 12 is not provided with such a long keyway as that shown in Figures 3 and 5 and in which case, the sleeve 43 shown in Figures 3 and 5 is not needed in this type installation (Figures 6 and 7). Since the parts shown in Figures 6 and 7 are identical to those shown in Figures 3 and 5 with the exception of the sleeve 43 and the key 44, the parts shown in Figures 6 and 7 which are identical will bear like reference characters to those shown in Figures 3 and 5 with the prime notation added.

The insert 42' shown in Figures 6 and 7 has a bore of smaller diameter therein than the insert 42 of Figures 3 and 5, so that it is rotatably mounted directly on the shaft 12 of the loom 10.

The third form of invention shown in Figures 8 through 10 may be used with either the crank shaft with a short keyway, as shown, or with the type of crank shaft which is shown in Figures 1 through 5 with a long keyway. In the event that this form is used with a crank shaft having a long keyway, a sleeve similar to the sleeve shown in Figures 3 and 5 will be used and the bore in the insert will be made longer.

Since many of the parts shown in Figures 8 through 10 are identical to those shown in Figures 1 through 7, the parts shown in Figures 8 through 10 which are identical will bear like reference characters with a double prime notation added.

Referring to Figures 8, 9 and 10, there will be observed an insert 42″ pressed into the hub 41″ of the disc friction gear 40″. The insert 42″ has a restricted portion 99 onto which the thrust bearing 56″ fits, a pair of annular grease grooves 101 and 102 and an enlarged portion 103 in which a grease seal 104 is secured as by a lock ring 105. The hub 41″ is provided with a grease fitting 106 communicating with the grease groove 101 and a grease fitting 107 communicating with the grease groove 102. The grease fitting 106 provides a means of lubricating the thrust bearing 56″ through a passageway 108 cut in the outer periphery of the insert 42″. The grease fitting 107 is provided to lubricate the insert 42″ as it is rotated about the crank shaft when the clutch mechanism is disengaged. The grease fitting 107 is communicatively connected with the grease groove 102 which is provided with a pair of drilled holes 110 leading to a serpentine grease groove 111 on the inner face of the bore in the insert 42″.

If desired, various details of the three forms of the invention illustrated may be combined without departing from the invention.

In the drawings and specification there has been set forth a preferred embodiment of the invention and although specific terms are employed, they are used in a generic and descriptive sense only, and not for purposes of limitation, the scope of the invention being defined in the claims.

I claim:

1. Drive means for a loom comprising a drive shaft, a friction disc mounted on the shaft, a disc friction gear rotatably and slidably mounted on said shaft, pressure applying means for moving said disc friction gear axially on said shaft into driving engagement with said friction disc, said disc friction gear having a hub portion, a sleeve surrounding said shaft adjacent said hub portion and fixed against rotation relative to said shaft, a tubular insert fixed in said hub portion and surrounding said sleeve with a working clearance, lubricant sealing means between said sleeve and the end of said insert adjacent said friction disc, a thrust bearing mounted in one end of said hub portion and adapted to be engaged by said pressure applying means, said hub portion having means therein for admitting lubricant therethrough, said tubular insert having an annular groove therein in alinement with said means in said hub portion, and said tubular insert also having a plurality of openings therein communicating with said annular groove to permit lubricant to flow therethrough, whereby the working clearance between said tubular insert and said sleeve may be lubricated, while the driving engagement between said disc friction gear and said friction disc is maintained free from lubricant due to the presence of said sealing means.

2. In a loom, a main drive shaft with a friction disc fixed thereon and a disc friction gear slidably and rotatably mounted thereon for imparting rotation to the friction disc, pressure applying means for moving said disc friction gear into driving engagement with said friction disc, said disc friction gear having a hub portion, a sleeve positioned within said hub portion and keyed to said shaft, a tubular insert fixed within said hub portion and rotatable relative to said sleeve, said tubular insert having an enlarged end portion adjacent said friction disc, lubricant sealing means fixed in the enlarged end of said tubular insert and sealing against said sleeve, said hub portion having an enlarged end portion remote from said friction disc, a thrust bearing positioned in said enlarged end of the hub and about said insert, said hub portion having a pair of openings therein for admitting lubricant therethrough, said tubular insert having a pair of annular grooves therein in alinement with the openings in said hub portion, said insert having an external passageway therein extending axially from one of said annular grooves to said thrust bearing, said insert having an internal lubricant distribution groove therein, and said tubular insert also having a plurality of spaced openings therein communicating with one of said annular grooves and with said internal lubricant distribution groove, whereby the working clearance between said tubular insert and said sleeve may be lubricated while the driving engagement between said disc friction gear and said friction disc is mtainained free from lubricant due to the presence of said sealing means.

3. In a loom having a drive shaft, a friction disc mounted on the shaft, a disc friction gear rotatably and slidably mounted on said shaft, pressure applying means for moving said disc friction gear axially on said shaft into driving engagement with said friction disc, said disc friction gear having a hub portion, the improvement comprising; a tubular insert fixed in said hub portion and surrounding said drive shaft in relatively rotatable relationship therewith, a sleeve fixed to the shaft to rotate therewith and telescoped within said tubular insert, there being a working clearance between said tubular insert and said sleeve, lubricant sealing means between said sleeve and the end of said insert adjacent said friction disc, said hub portion having means therein for admitting lubricant therethrough, said tubular insert having an annular groove therein in alinement with said means in said hub portion, and said tubular insert also having a plurality of openings therein communicating with said annular groove to permit lubricant to flow therethrough, whereby the working clearance between said tubular insert and said sleeve may be lubricated while the driving engagement between said disc friction gear and friction disc is maintained free from lubricant due to the presence of said sealing means.

4. The improvement defined in claim 3, wherein said tubular insert has an enlarged portion integral therewith on the end of the insert adjacent said friction disc, said enlarged portion being provided with a recess in which said sealing means is positioned.

5. In a lubricated bearing assembly for a rotatable shaft, a hub member surrounding the shaft and spaced therefrom, a tubular insert fixed within said hub member, a sleeve fixed to said shaft to rotate therewith and telescoped within said tubular insert, there being a working clearance between said insert and said sleeve, lubricant sealing means between said tubular insert and said sleeve at one end of said tubular insert, said hub member having means therein for admitting lubricant therethrough, said tubular insert having an annular groove therein in alinement with said means in said hub member, and said tubular insert also having a plurality of openings therein communicating with said annular groove to permit lubricant to flow therethrough, said lubricant sealing means being adapted to seal against the flow of lubricant in one direction whereby any lubricant leakage from said bearing assembly must occur in the opposite direction.

6. In a lubricated bearing assembly for a rotatable shaft, a hub member surrounding the shaft and spaced therefrom, a tubular insert fixed within said hub member, lubricant sealing means between said tubular insert and said shaft at one end of said tubular insert, said hub member having means therein for admitting lubricant therethrough, said tubular insert having an annular groove therein in alinement with said means in said hub member, and said tubular insert also having a plurality of openings therein communicating with said annular groove to permit lubricant to flow therethrough, said lubricant sealing means being adapted to seal against the flow of lubricant in one direction whereby any lubricant leakage from said bearing assembly must occur in the opposite direction.

7. In the lubricated bearing assembly defined in claim 6, wherein the means in said hub member comprises a pair of spaced openings, said tubular insert being provided with a second annular groove, each said annular groove being in alinement with one of said openings in said hub member, a thrust bearing held within said hub member, said tubular insert having an axially extending external passageway from said second annular groove to said thrust bearing, said tubular insert further having an internal lubricant distribution groove in communication with first-mentioned annular groove through said plurality of openings.

8. In a loom having a drive shaft, a friction disc mounted on said shaft, a disc friction gear rotatably and slidably mounted on said shaft, pressure applying means for moving said disc friction gear axially on said shaft into driving engagement with said friction disc, said disc friction gear having a hub portion, the improvement comprising; a tubular insert fixed in said hub portion and surrounding said drive shaft, an enlarged end portion integral with said tubular insert extending between the hub portion and the friction disc, a sleeve fixed to the shaft and telescoped within said tubular insert, means for admitting lubricant between said tubular insert and said sleeve, and lubricant sealing means between the insert and the sleeve and disposed at the end of the sleeve adjacent the proximal faces of the said friction disc and the disc friction gear, whereby the driving engagement between said disc friction gear and said friction disc is maintained free from lubricant due to the presence of said sealing means.

9. Driving means for a loom comprising a shaft, a friction disc fixed on the shaft and a driving disc friction gear rotatably mounted on the shaft and slidably movable to engage the friction disc, pressure applying means for moving said disc friction gear into driving engagement with said friction disc, said disc friction gear having a hub portion, a tubular insert fixed in said hub portion and about said drive shaft, lubricant sealing means positioned between said shaft and the end of said tubular insert adjacent the friction disc, a thrust bearing mounted in one end of said hub portion and adapted to be engaged by said pressure applying means, and means for admitting lubricant through said hub, said tubular insert having an annular groove therein in alinement with said means for admitting lubricant through said hub, and said tubular insert also having a plurality of openings therein communicating with said annular groove to permit lubricant to flow therethrough, whereby the clearance between said tubular insert and said shaft may be lubricated while the driving engagement between said disc friction gear and said friction disc is maintained free from lubricant due to the presence of said sealing means.

References Cited in the file of this patent
UNITED STATES PATENTS

| | | |
|---|---|---|
| 976,841 | Beekman | Nov. 29, 1910 |
| 1,391,668 | Cushman | Sept. 27, 1921 |
| 1,602,508 | Seville | Oct. 12, 1926 |
| 1,879,839 | Bown et al. | Sept. 27, 1932 |
| 2,086,787 | Whiteley | July 13, 1937 |
| 2,167,450 | Ginsburg | July 25, 1939 |
| 2,201,567 | Walters | May 21, 1940 |
| 2,424,530 | Zubler | July 22, 1947 |
| 2,449,157 | Bahan | Sept. 14, 1948 |
| 2,760,615 | Kershner | Aug. 28, 1956 |